S. SHIRLEY.
ANIMAL ARRESTER.
APPLICATION FILED JUNE 11, 1917.
1,266,068.
Patented May 14, 1918.
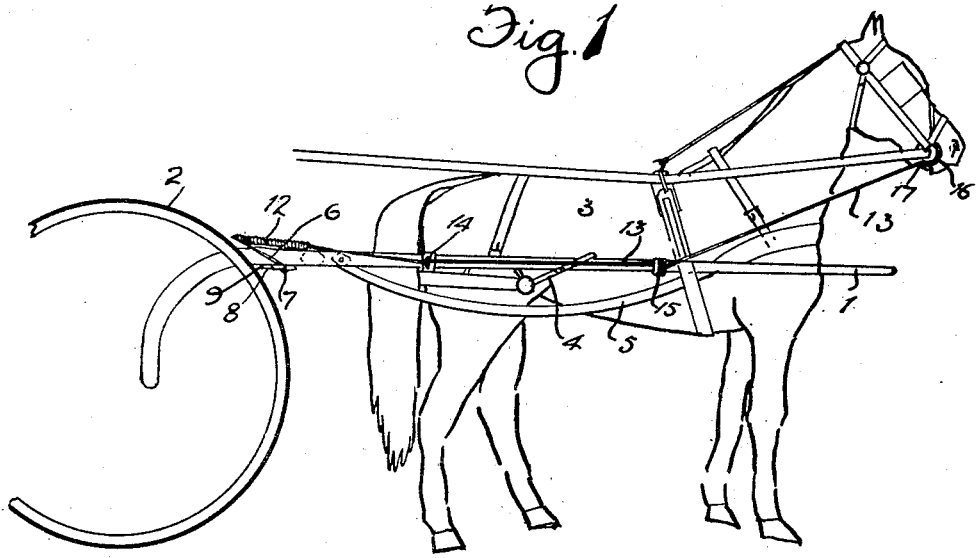
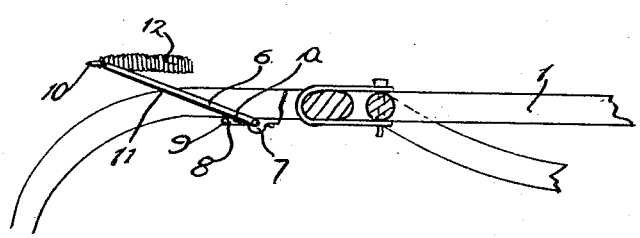
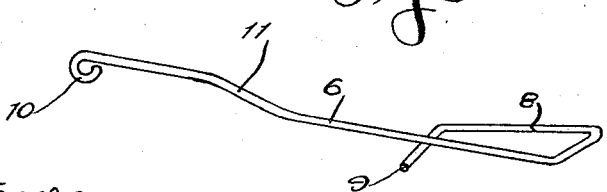

UNITED STATES PATENT OFFICE.

SAMUEL SHIRLEY, OF WINNIPEG, MANITOBA, CANADA.

ANIMAL-ARRESTER.

1,266,068.     Specification of Letters Patent.     Patented May 14, 1918.

Application filed June 11, 1917. Serial No. 174,122.

*To all whom it may concern:*

Be it known that I, SAMUEL SHIRLEY, of the city of Winnipeg, in the Province of Manitoba, Canada, have invented certain new and useful Improvements in Animal-Arresters, of which the following is the specification.

The invention relates to improvements in arresters, particularly adapted for holding horses attached to vehicles and the object of the invention is to provide a simple, inexpensive easily operated and effective appliance which can be readily attached to some stationary part of the vehicle and which when set will serve to arrest a horse when starting when left on the curb or other location.

The invention consists essentially in a pivot lever, releasable means for stopping the lever in fixed positions, a coil spring attached to the lever and a strap attached to the spring, the parts being arranged and constructed as hereinafter more particularly described and later pointed out in the appended claims, reference being had to the accompanying drawing in which:—

Figure 1 represents a side view of the appliance as it appears in use and set to hold the animal.

Fig. 2 represents an enlarged detailed side view of the working parts.

Fig. 3 represents a perspective view of the lever.

In the drawing like characters of reference indicate corresponding parts in the several figures.

1 represents the ordinary shafts of the vehicle represented at 2 and 3 a horse hitched in the shafts in the ordinary way, it being here noticed that the holdback straps 4 are tight while the tugs 5 are slack. This particular position of the tugs and holdback straps is shown purposely as on the give and take between the tugs and the holdback straps the operation of my invention depends.

Here I might explain that when a horse is being driven the tugs are taut and the holdback straps are slack while on the other hand when a horse is stopped the vehicle moves up, so to speak, in respect to the horse so that the holdback straps and breeching are tight and the tugs become loose. The result of this is that when the animal is started there is an amount of slackness in the tugs which has to be taken up before the vehicle is pulled.

Reverting now again to the drawing, 6 represents a lever pivotally secured at 7 such as by a bearing strap to a stationary part of the vehicle such as the underside of the shaft. A crank 8 is associated with the lever so as to turn with the same. The free end of the crank is formed with an offset right angle stop 9 for a purpose later described.

The free end of the lever is supplied with an eye 10 and is given a slight offset bend at 11. In actual practice the lever and crank are disposed at a small angle to each other as best shown in Fig. 2, the angle being indicated at "*a*." To the eye 10 I attach a coil spring 12 which is fairly strong so that when working it will hold back the head of a horse.

The appliance as above described is attached in the position shown, preferably to the shaft, and the arrangement is such that when the lever is in the back position, the free end thereof is above the pivot point 7, the position being a fixed one owing to the striking of the stop 9 with the underside of the shaft and the engagement of the bend at 11 with the top side of the shaft.

In connection with the above it is to be understood that it is only sufficient to prevent the lever from falling down under the action of gravity and also to allow of the release of the lever by the springing of it away from the shaft to allow the bend to escape the shaft and the lever to be swung down or released.

To the free end of the spring I attach a pulling strap 13 which is suitably guided on the shaft as indicated at 14 and 15 and has the forward end thereof fastened to the bit ring 16 such as by a snap hook 17.

To understand the operation of this appliance, it is to be remembered that when a horse is standing the vehicle draws up on him to slacken the tugs. The spring, strap and lever are designed such that when the horse is standing and the lever is drawn back to the position shown in the drawing there is no slackness in the strap nor is the spring extended. Obviously then, should the horse try to advance as allowed for in the slackness of the tugs, the spring will pull through the strap on his mouth and arrest him.

In the set back position it will be observed that the rear end of the lever is above what might be termed the dead-center position so that any forward pull brought on it tends to rotate it ahead, which rotation is counteracted by the stop 9.

When one desires to release the appliance he simply catches the hand piece 11 and throws it downwardly and ahead until the stop hits the shaft at the other side of the bearing 7. This movement gives the slackness in the pulling strap necessary to give the horse a free head when driving.

From the above disclosure it will be seen that if the appliance be set and the horse should throw back his mouth and cause a slackness in the strap the lever will not fall down as it is held by the bend as before explained.

This really is the only reason why a bend is necessary. While I have shown a bend, I do not wish to be limited to this as it is very obvious that the lever could be straight and a slight striking lug such as a pin attached to the shaft over which the lever could be sprung to pass it to the fixed position or to the released position.

What I claim as my invention is:—

1. An animal arresting appliance for vehicles comprising a lever pivotally secured to a stationary part of the vehicle, means integral with the lever for limiting it in its forward and rear positions, a spring attached to the free end of the lever and a pulling strap connecting the spring with the head of the animal.

2. An animal arresting appliance for vehicles comprising a lever pivotally secured to the shaft of the vehicle, a crank associated with the lever and having the end thereof formed into a stop and adapted to engage with the shaft, the said crank and lever being disposed at an angle one to the other, a spring secured to the free end of the lever and a pulling strap extending between the spring and the head of the animal.

3. An animal arresting appliance for vehicles comprising a lever pivotally secured to the shaft of the vehicle and having an offset bend therein toward the shaft adapted to hold the lever in a fixed set position by engagement with the shaft, a crank associated with the lever and having the end thereof formed into a stop and adapted to engage with the shaft, the said crank and lever being disposed at an angle one to the other, a spring secured to the free end of the lever and a pulling strap extending between the spring and the head of the animal.

Signed at Winnipeg, this 31st day of May, 1917.

SAMUEL SHIRLEY.

In the presence of—
 GERALD S. BOXBAUGH,
 ROLAND FOSTER.

Copies of this patent may be obtained for five cents each, by addressing the "Commissioner of Patents, Washington, D. C."